United States Patent [19]

Marioni

[11] Patent Number: 5,627,423

[45] Date of Patent: May 6, 1997

[54] PERMANENT-MAGNET ROTOR FOR ELECTRIC MOTORS AND METHOD OF MANUFACTURING THE SAME

[75] Inventor: Elio Marioni, Dueville, Italy

[73] Assignee: Askoll S.p.A., Povolaro Dueville, Italy

[21] Appl. No.: 253,268

[22] Filed: Jun. 2, 1994

[30] Foreign Application Priority Data

Jun. 11, 1993 [IT] Italy ................... PD93A0129
Apr. 7, 1994 [IT] Italy ................... PD94A0066

[51] Int. Cl.⁶ ................... H02K 21/12; H02K 15/00
[52] U.S. Cl. ................... 310/156; 310/42
[58] Field of Search ................... 310/156, 261, 310/42, 45, 51, 43, 214, 215

[56] References Cited

U.S. PATENT DOCUMENTS

| | | | |
|---|---|---|---|
| 4,414,523 | 11/1983 | Pieters | 335/302 |
| 4,423,345 | 12/1983 | Nilsson | 310/153 |
| 4,954,736 | 9/1990 | Kawamoto et al. | 310/156 |
| 5,111,094 | 5/1992 | Patel et al. | 310/156 |
| 5,121,605 | 6/1992 | Oda et al. | 60/608 |
| 5,175,461 | 12/1992 | Zigler et al. | 310/156 |
| 5,200,662 | 4/1993 | Tagami et al. | 310/261 |
| 5,268,607 | 12/1993 | McManus | 310/89 |
| 5,345,129 | 9/1994 | Molnar | 310/156 |
| 5,397,951 | 3/1995 | Uchida et al. | 310/156 |

FOREIGN PATENT DOCUMENTS

| | | |
|---|---|---|
| 0218477 | 4/1976 | European Pat. Off. |
| 0459355 | 12/1991 | European Pat. Off. |
| 2673776 | 9/1992 | France . |
| 3102959 | 1/1982 | Germany . |
| 2117188 | 10/1983 | United Kingdom . |
| 2191638 | 12/1987 | United Kingdom . |
| 2217924 | 11/1989 | United Kingdom . |

OTHER PUBLICATIONS

Patents abstracts of Japan–vol. 10, No. 8, (E–373)(2065) 14 Jan. 1986 &JP–A–60170444–3 Sep. 1985–abstract.

Patent abstracts of Japan–vol. 09–No. 65 (E–304)(1788) 26 Mar. 1985–& JP–A–59204453–19 Nov. 1984–abstract.

Primary Examiner—Thomas M. Dougherty
Assistant Examiner—Michael J. Wallace, Jr.
Attorney, Agent, or Firm—Guido Modiano; Albert Josif

[57] ABSTRACT

Permanent-magnet rotor for electric motors including at least two semitubular permanent magnets which are at least partially embedded in a core made of two-component epoxy resin or plastics. The core is obtained in a mold by molding in place or pouring over a pre-molded casing that contains the magnets, or by pouring so as to form, together with said core, a containment casing.

16 Claims, 4 Drawing Sheets

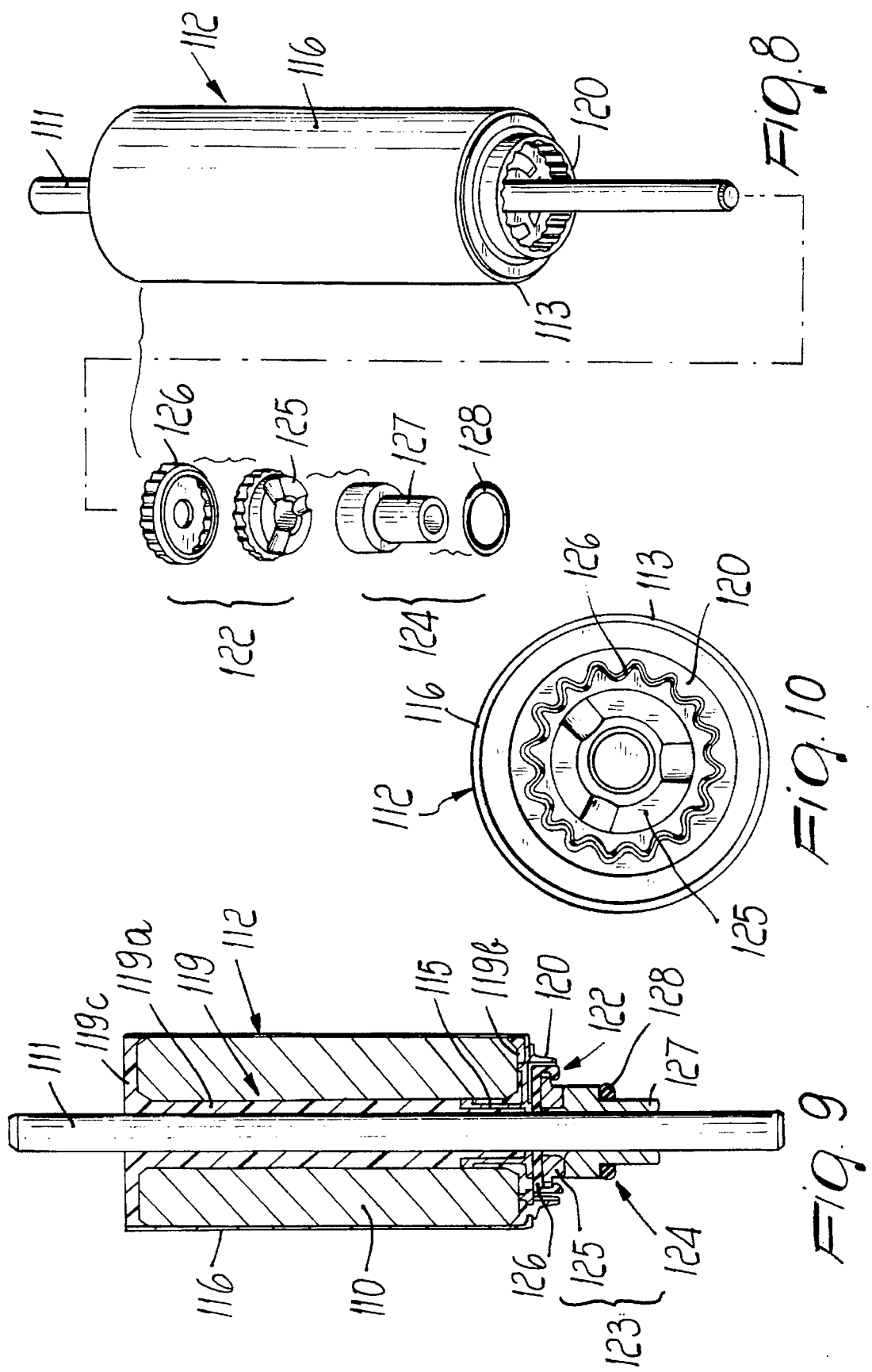

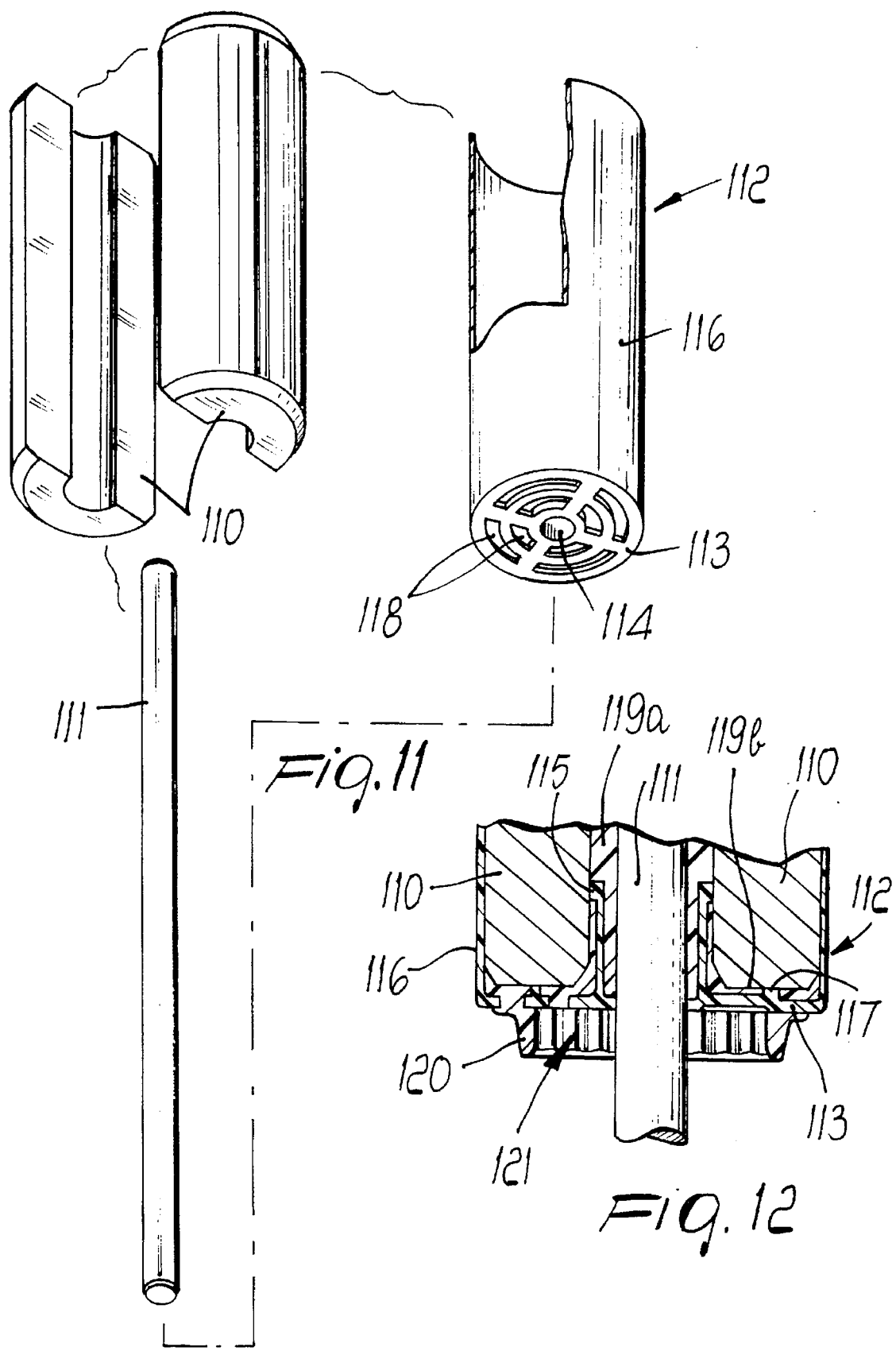

PERMANENT-MAGNET ROTOR FOR ELECTRIC MOTORS AND METHOD OF MANUFACTURING THE SAME

BACKGROUND OF THE INVENTION

The present invention relates to a permanent-magnet rotor for electric motors, and to a method of making a permanent-magnet rotor.

As is known, electric motors with permanent-magnet rotors are currently used in the field of small centrifugal pumps.

The magnets that are used are produced by sintering appropriate powders under the action of a magnetic field.

For motors having rotors with an axial size of up to approximately 3 cm, the magnets are manufactured with a tubular shape by filling an appropriate mold with the powders and by applying axial compression.

The compression is such that the axial dimension of the finished part is approximately one third of the dimension occupied by the powders when mold filling ends.

For electric motors with a rotor having greater axial dimensions it becomes practically impossible to obtain the rotor with the above described method in an economically and qualitatively satisfactory manner, and therefore it is preferred to manufacture semitubular parts to be assembled so as to compose the tubular rotor.

These semitubular parts are again obtained by sintering powders in a magnetic field, but in this case compression occurs at right angles to the axial direction.

For rotor assembly, initially the two semitubular permanent magnets used to be enclosed in a tubular casing made of stainless steel which, being a diamagnetic material, in theory has no effect on the magnetic field produced by the stator of the motor.

However, practical tests have shown that a dielectric forms in the air gap between the magnets and the pole pieces due to the presence of the stainless steel casing and of the wall of the rotor chamber, causing a 30% drop in efficiency.

An attempt was later made to embed the two semitubular permanent magnets in an injection-molded plastic casing, but even this attempt failed to yield the expected results due to the fact that the necessary minimum thicknesses of the plastic material and the significant axial size of the rotor, combined with the rather low fluidity of the injection-molded material, prevent the complete filling of the intended regions and thus give an unacceptable final result.

Increase in injection pressures to achieve complete filling caused cracking of the magnets due to their great hardness and consequent great fragility.

SUMMARY OF THE INVENTION

A principal aim of the present invention is therefore to provide a permanent-magnet rotor of the type with semitubular magnets so as to eliminate the above described drawbacks encountered in previous attempts.

A consequent important object is to provide a rotor the structure whereof has no effect on the operation of the motor.

Another object is to provide a method that allows to mass-produce the rotor at low costs.

Another object is to provide a method that allows to obtain high-quality rotors for electric motors.

With this aim, these objects and others in view, which will become apparent hereinafter, the invention provides a permanent-magnet rotor for electric motors, characterized in that it comprises at least two semitubular permanent magnets which are at least partially embedded in a core, made of two-component epoxy resin, obtained in a mold by pouring so as to form a containment casing in addition to said core, or made of two-component epoxy resin or plastics obtained in a mold by pouring or molding in place over a pre-molded containment casing.

BRIEF DESCRIPTION OF THE DRAWINGS

Further characteristics and advantages of the rotor according to the invention will become apparent from the following detailed description of two preferred embodiments thereof, illustrated only by way of non-limitative example in the accompanying drawings, wherein:

FIG. 8 is a perspective exploded view of a second embodiment of the rotor with a thrust bearing which is associated therewith when installed;

FIG. 9 is a sectional view of the unit of FIG. 8 in assembled condition;

FIG. 10 is a view, taken from the thrust bearing end, of the rotor of FIG. 8 with part of the thrust bearing;

FIG. 11 is an exploded perspective view of the components of the rotor of FIG. 8 prior to assembly in the mold;

FIG. 12 is an enlarged-scale sectional view of a detail of the rotor of FIG. 8, taken from the thrust bearing end.

DESCRIPTION OF THE PREFERRED EMBODIMENTS

Figure 1:
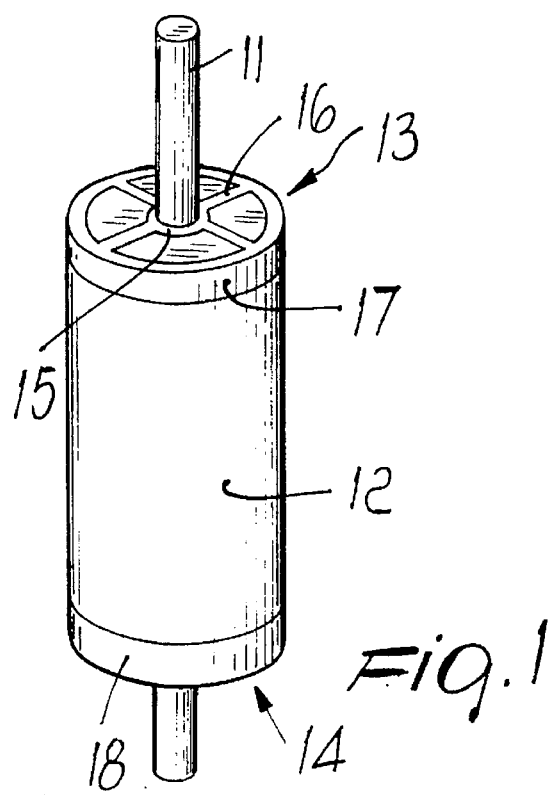
FIG. 1 is a perspective view of a first embodiment of the rotor according to the present invention.
Figure 2:
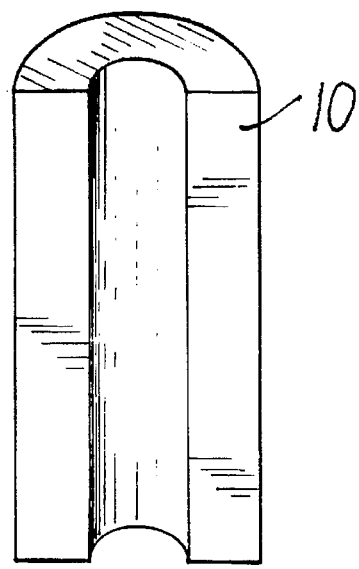
FIG. 2 is a perspective view of a magnet included in the rotor of FIG. 1.
Figure 4:
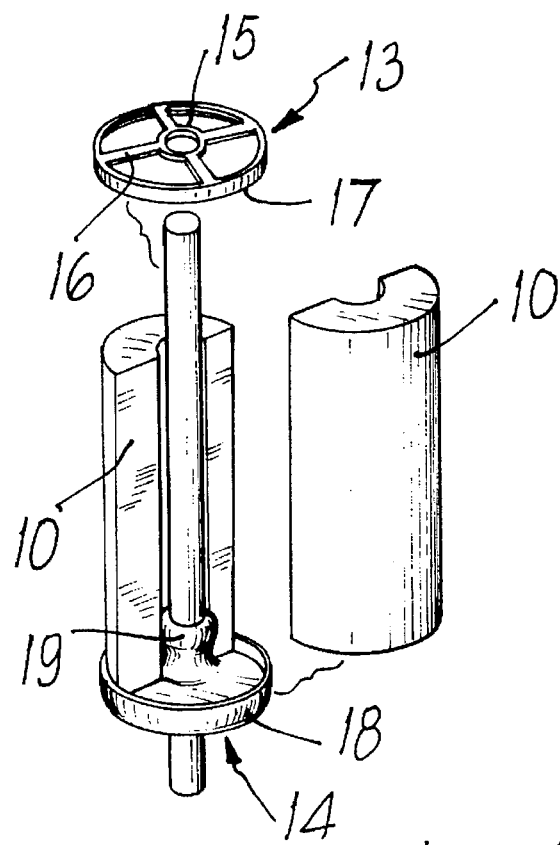
FIG. 4 is a perspective view of the rotor of FIG. 1, during assembly prior to insertion in the mold.

With reference to the above FIGS. 1 to 7, a permanent-magnet rotor for electric motors according to the invention comprises, in a first embodiment, two complementarily shaped semitubular permanent magnets 10 which are embedded, together with a ceramic shaft 11 axially inserted in them, inside a casing 12 made of two-component epoxy resin.

The rotor is completed, at its heads, by respective flanges 13 and 14 made of plastics which, as described in greater detail hereinafter, form elements for the correct positioning and centering of the magnets 10 and of the shaft 11 as well as elements for containing the resin during pouring.

The first flange 13 comprises a central ring 15 which is suitable to be crossed by the shaft 11 with a snug fit and is connected by means of radial spokes 16 to a perimetric ring 17 that extends axially and is suitable to retain the magnets 10.

The second flange 14 is instead constituted by a ring 18 with a U-shaped cross-section; the ends of the magnets 10 are inserted between the edges of said ring.

Figure 3:
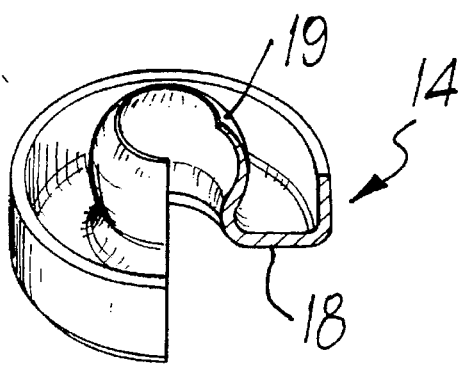
FIG. 3 is a partially sectional perspective view of a head flange included in the rotor of FIG. 1.
Figure 5:
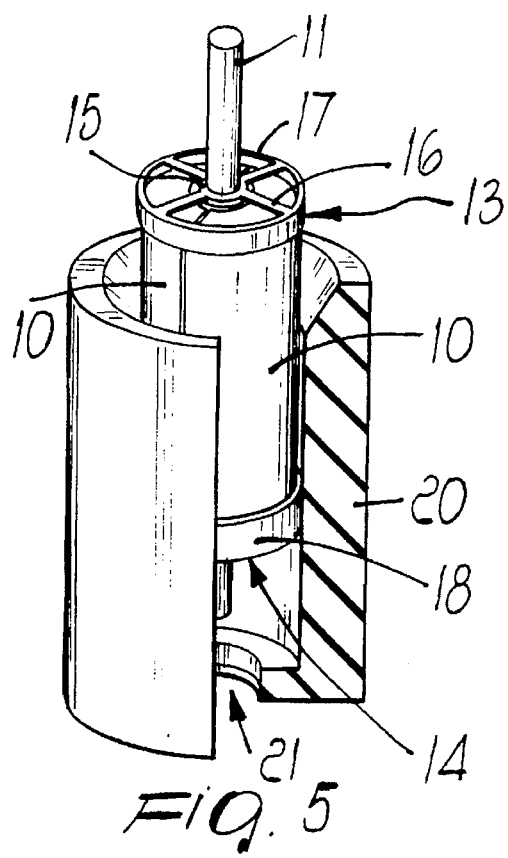
FIG. 5 is a perspective view of the rotor of FIG. 1 during insertion in the mold.
Figure 6:
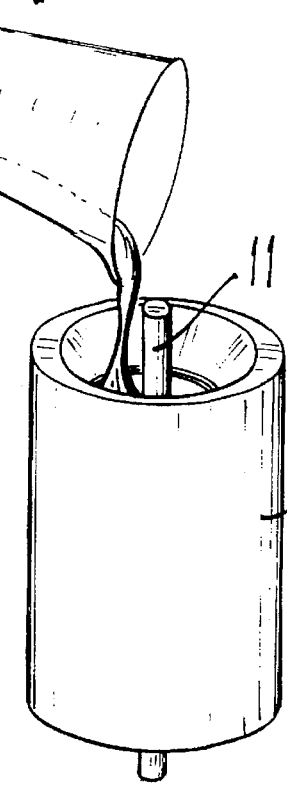
FIG. 6 is a view of the step for the pouring of the rotor of FIG. 1.
Figure 7:
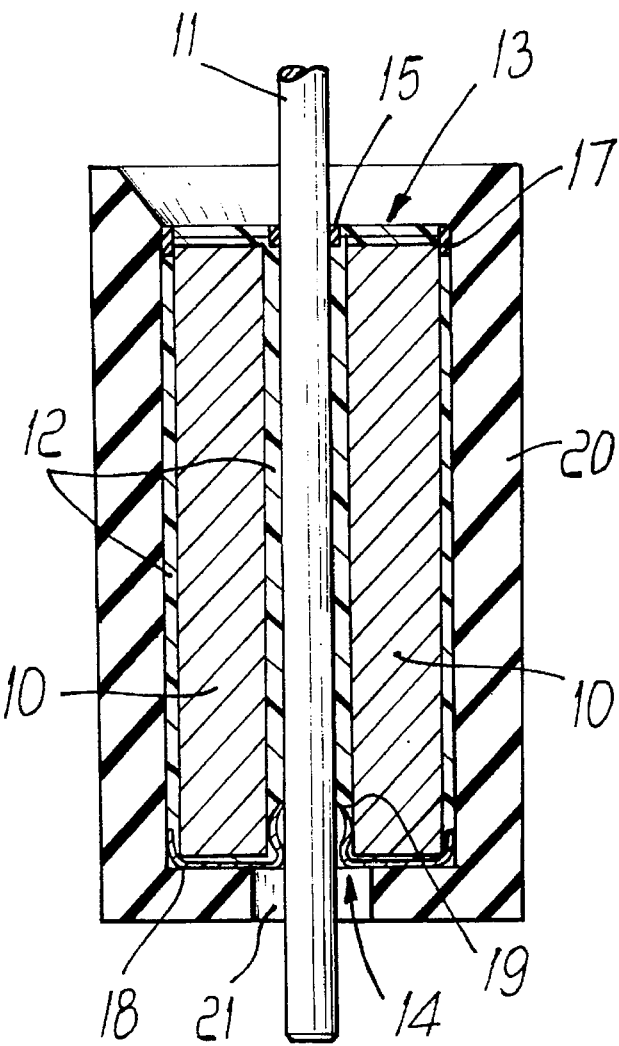
FIG. 7 is a sectional view of the rotor of FIG. 1 in the mold after pouring.

An elastic lip 19 extends from the inner edge of the ring 18 and is suitable to retain the shaft 11 in position. As seen in FIGS. 3 and 7, the lip 19 essentially has an S-shaped cross-section in a plane extending parallel to the longitudinal extension of the shaft 11, with a tip of the lip 19 forming a central hole through which the shaft 11 extends, and a curved portion of the S-shaped lip 19 engages the permanent magnet segments 10.

The coupling between the lip 19 and the shaft 11 is such that it does not allow resin to pass during pouring.

As regards the production process, a cup-shaped mold 20 is used which has a substantially cylindrical inner wall with a wide central bottom hole 21 required for the passage of the shaft 11 and for extraction.

The pre-assembled rotor is placed in the mold 20, after applying a silicone release agent on the walls, by first inserting the flange 14, which has such an outer diameter as to sealingly couple to the bottom portion of the internal wall of said mold.

The upper flange 13 also externally forms a seal on the inner wall of the mold 20.

It should be noted that in a downward region the couplings between the flange 14 and the shaft 11 and between said flange and the mold 20 close all passages.

The subsequent operation consists in pouring a two-component epoxy resin into the empty regions 22 of the mold 20, through the empty spaces or through holes defined between the spokes 16 of the flange 13, and in allowing said resin to cure by reaction of the base with the catalyst.

The empty regions 22 extend so as to form the casing 12 in which the magnets 10 and the shaft 11 are embedded.

Finally, by applying adequate force to the flange 14, the rotor is extracted from the mold through the hole 21.

Conveniently, in order to facilitate extraction from the mold, the inner wall of the mold 20 is given a slight taper.

The high fluidity of the resin ensures complete filling of the empty regions 22 in the mold 20 and thus complete embedding of the magnets 10 and of the shaft 11 in the casing which the resin finally forms.

Pouring occurs at atmospheric pressure or at sub-atmospheric pressure (to avoid the forming of air bubbles in the resin) and therefore the magnets 10 and the shaft 11 are not subjected to intense stresses that might damage them.

The resin furthermore has no effect on the magnetic field in which the rotor is placed during operation.

With reference to the above mentioned FIGS. 8 to 12, a permanent-magnet rotor for electric motors according to the invention comprises, in a second embodiment, two complementary shaped semitubular permanent magnets 110 which are contained, together with a ceramic shaft 111 axially inserted between them, in a substantially cup-shaped casing 112 which is obtained separately by injection-molding plastic material.

Naturally, the bottom 113 of said cup-shaped casing 112 is centrally provided with a hole 114 for the passage of the ceramic shaft 111.

It should also be noted that an axial tubular extension 115 again protrudes from the bottom 113 and retains the permanent magnets 110 in their correct position between said extension and the outer wall 116 of the casing 112.

Again, the bottom 113 has an annular ridge 117 for supporting the magnets 110 in a raised position, forming empty passage regions.

Again, the bottom 113 has through holes 118.

As shown in the figures, the diameter of the ceramic shaft 111 leaves a certain clearance with respect to the magnets 110.

The rotor is completed by a core 119 that mutually rigidly couples the magnets 110, the shaft 111 and the cup-shaped casing 112 and is obtained in a mold so as to fill the regions left empty by said parts, particularly the space 119a between the shaft 111 and the magnets 110, the space 119b between the bottom 113 and said magnets 110, and an upper disk-like portion 119c.

The core 119 is made of injection-molded plastics or of poured two-component epoxy resin.

The bottom 113 of the casing 112 is arrangeable at the end where the impeller, not illustrated in the drawings, is located; an internally toothed ring gear 120 rises coaxially to the shaft 111 from said bottom and is produced, in this case, by the molding-in-place operation, using the same material as the core 119, performed by virtue of the presence of the through holes 118 formed in the bottom 113.

The ring gear can also be provided monolithically with the bottom of the casing (for example if the core is formed by pouring in a mold).

Said ring gear 120 forms the seat 121 for a first component 122 of a thrust bearing, generally designated by the reference numeral 123, which is completed by a second component 124.

The first component 122 comprises an annular ceramic element 125 which is externally provided with teeth and is enclosed in an elastomeric cap 126 provided with circumferential teeth and forming an elastic support in the seat 121 on the bottom 113.

The second component 124 includes a metal bush 127 provided with an outer toroidal ring 128 made of elastomeric material.

The two components 122 and 124 are assembled so that they are in end-to-end contact.

At this point it should be stressed that the presence, in the rotor, of a cup-like casing 112 formed separately and then joined to the rest in a mold allows to form the outer wall 116 of said casing with very low thicknesses (a maximum thickness of 0.5 mm is optimum for the rotor) without causing the known problems involved in forming it directly in the mold together with the rest.

The fact that the casing 112 is formed separately allows to use, for said casing, materials that better withstand high temperatures, for example for use with pumps for circulating hot water.

The presence of the cup-like casing 112 eliminates production and utilization problems as regards both the core obtained by molding in place and the core possibly made of resin which does not deteriorate with use since it is inside the rotor and not exposed to damaging chemicals.

It should also be particularly stressed that the support and the associated shaped seat on the impeller side for the thrust bearing 123 is obtained during the same molding-in-place operation.

Consequently, the first component 122 of the thrust bearing is advantageously arranged in the best way with respect to the second component 124 against which it slides.

The elastomeric cap 126 forms an intermediate means that can be adapted in order to damp vibrations.

The shape of the seat is such that the assembly formed by the first component 122 and by the elastomeric cap 126 is located inside the ring 120 but is not actually retained in a fixed manner to the walls so that it can assume adequate planarity with respect to the second component 124.

The only coupling, formed by the teeth of the ring gear 120 and of the cap 126, causes the component 122 to rotate by means of the rotor.

In practice it has been observed that the intended aim and objects have been achieved in both embodiments.

The invention thus conceived is susceptible to numerous modifications and variations, all of which are within the scope of the inventive concept.

All the details may furthermore be replaced with other technically equivalent elements.

In practice, the materials employed, so long as they are compatible with the contingent use, as well as the dimensions, may be any according to the requirements.

What is claimed is:

1. A permanent-magnet rotor for electric motors comprising:

a shaft having a longitudinal extension;

at least two semitubular permanent magnet segments arranged about said shaft;

a molded casing including a central cylindrical portion interposed between said shaft and said permanent magnet segments; and a bottom flange portion connected to said permanent magnet segments and said shaft and said central cylindrical portion of said molded casing at a bottom end region of the rotor, said bottom flange portion comprising a bottom wall portion and a central hole in said bottom wall portion through which said shaft extends, said bottom flange further comprising an inner circumferential lip protruding from said bottom wall portion about said central hole in a direction substantially parallel to said longitudinal extension of the shaft in a space between said shaft and said permanent magnet segments, said inner circumferential lip engaging internal surface portions of said permanent magnet segments so as to retain said permanent magnet segments in position relative to said shaft whereby to properly form said central cylindrical portion of said molded casing between said shaft and permanent magnet segments, and said inner circumferential lip extending in said space between said shaft and said permanent magnet segments for a limited extent with respect to the extension of said shaft whereby for permitting said central cylindrical portion of said molded casing to be interposed between said shaft and said permanent magnet segments.

2. The rotor of claim 1 wherein said molded casing further includes a peripheral cylindrical portion extending from said bottom wall portion and surrounding said permanent magnet segments.

3. The rotor of claim 1 wherein said inner circumferential lip has an S-shaped cross-section in a longitudinal plane with a tip forming said central hole of said upper flange portion and a curved portion engaging said permanent magnet segments.

4. The rotor of claim 3 wherein said inner circumferential lip is elastic and wherein said tip sealingly engages said shaft.

5. The rotor of claim 4 wherein said bottom flange portion further includes an outer peripheral circumferential lip protruding in a direction substantially parallel to said longitudinal extension of said shaft and engaging external surface portions of said permanent magnet segments.

6. The rotor of claim 1 further comprising an upper flange portion connected to said permanent magnet segments and said shaft and said central cylindrical portion of said molded casing at an upper end region of the rotor, said upper flange portion comprising a central hole through which said shaft extends and at least one through hole through which material forming said molding casing has been introduced.

7. The rotor of claim 6 wherein said upper flange portion comprises: an inner ring forming said central hole of said upper flange portion; an outer ring engaging said permanent magnet segments; and radial spokes interconnecting said inner and outer rings and defining said at least one through hole.

8. The rotor of claim 1 wherein said bottom flange portion further comprises an annular ridge protruding from said bottom wall portion in a direction substantially parallel to said longitudinal extension of said shaft and engaging bottom end portions of said permanent magnet segments whereby for spacing said permanent magnet segments from said bottom wall portion of said bottom flange portion.

9. The rotor of claim 8 wherein said molded casing further includes bottom portions arranged between said bottom wall portion of said bottom flange portion and said bottom end portions of said permanent magnet segments.

10. The rotor of claim 9 further comprising a plastics material cup-shaped casing with an open top and a bottom formed by said flange portion, and wherein said molded casing further includes an upper disk-like portion arranged at said open top in contact with upper end portions of said permanent magnet segments.

11. The rotor of claim 10 wherein said cup-shaped casing comprises an outer cylindrical wall engaged in contact with outer surface portions of said permanent magnet segments.

12. The rotor of claim 1 wherein a ring gear forming part of said molded casing protrudes externally from said bottom wall portion of said bottom flange portion, said bottom flange portion comprising at least one through hole in said bottom wall portion through which material forming said ring gear has passed, said ring gear forming a seat for accommodating and supporting a component of a thrust bearing.

13. The rotor of claim 12 wherein said component comprises a ceramic annular element which is partially covered by an elastomeric cap suitable to rest in said seat formed externally on said bottom flange portion.

14. The rotor of claim 13 wherein said ring gear has an internal set of teeth for meshing with an external set of teeth of said component of said thrust bearing, clearance being provided between said sets of teeth.

15. The rotor of claim 1 wherein said molded casing further includes radial portions arranged in regions separating said permanent magnet segments.

16. The rotor of claim 1 wherein said molded casing is made of a material chosen from an epoxy resin and a plastics material.

* * * * *